United States Patent [19]

Imai et al.

[11] Patent Number: 4,812,345
[45] Date of Patent: Mar. 14, 1989

[54] OPTICAL DISK SUBSTRATE

[75] Inventors: Shozaburo Imai, Toyonaka, Japan; Michihisa Isobe, Dusseldorf, Fed. Rep. of Germany; Kazuhiro Yokoo; Hideaki Matsuura, both of Niihama, Japan

[73] Assignee: Sumitomo Chemical Company, Limited, Osaka, Japan

[21] Appl. No.: 155,109

[22] Filed: Feb. 11, 1988

Related U.S. Application Data

[63] Continuation-in-part of Ser. No. 35,882, Apr. 8, 1987, abandoned.

[30] Foreign Application Priority Data

Apr. 14, 1986 [JP] Japan ................................. 61-85804

[51] Int. Cl.$^4$ ................................. G11B 7/24
[52] U.S. Cl. ................................. 428/65; 430/270; 430/945; 369/288
[58] Field of Search ................... 428/65, 64; 430/271, 430/945, 270; 369/284, 286, 288; 526/282

[56] References Cited

U.S. PATENT DOCUMENTS 4,591,626  5/1986  Kawai et al. ........................ 526/282

*Primary Examiner*—Alexander S. Thomas
*Attorney, Agent, or Firm*—Stevens, Davis, Miller & Mosher

[57] ABSTRACT

There is disclosed herein an optical disk substrate comprising a copolymer produced by polymerizing 50 to 65% by weight of methyl methacrylate (a) units, 20 to 35% by weight of tricyclo[5.2.1.0$^{2.6}$]deca-8-yl methacrylate (b) units, 5 to 25% by weight of cyclohexyl methacrylate (c) units and 1 to 5% by weight of acrylic ester (d) units.

2 Claims, No Drawings

OPTICAL DISK SUBSTRATE

This application is a Continuation-Application-In-Part of the application, U.S. Ser. No. 35882 filed on Apr. 8, 1987 abandoned.

TECHNICAL FIELD OF THE INVENTION

This invention relates to an optical disk substrate used for optically recording and reproducing information, which is formed of a methacrylic resin of low hygroscopicity.

PRIOR ART

Information recording and reproducing systems have began attracting attention recently, which detect, by using a laser beam spot, recorded information engraved as minute pits on a disk substrate, thereby to reproduce images and sounds, and further which effect a high density information recording and reproduction based on the change of optical properties of a recording medium provided on a substrate surface.

For disk substrates, used in these recording and reproducing systems, required characteristics are good dimensional stability, high optical homogeneity and low birefringence in addition to good transparency.

Although use of a resin material for disk substrates makes it possible to mold a large number of duplicate disks at low cost, it is well known that in molding the disk substrate the resin undergoes molecular orientation and develops birefringence in the course of flowing and cooling of the resin. This constitutes a fatal defect for an optical disk substrate owing to birefringence.

Since molecular orientation in molding is unavoidable particularly in injection molding, resin materials with low level of optical anisotropy suitable for molding optical disk substrates are found at present only in polymers comprising methyl methacrylate as the principal component.

However, when known polymers comprising methyl methacrylate as the principal component are used for the substrate, they have a drawback in that since they are highly hygroscopic, they are poor in dimensional stability and develop a warp and a twist under humid conditions.

The above-mentioned drawback is described in detail, for example, in Nikkei Electronics (June 7, 1982, p. 188). For this reason, the material used for acoustic compact disks is aromatic polycarbonate resin of low hygroscopicity.

On the other hand, since aromatic polycarbonate resin has highly anisotropic aromatic rings in the main chain, it is difficult to decrease the birefringence of substrates molded therefrom. Although various attempts have been made including the decrease of the molecular weight and the examination of molding conditions, since its birefringent property results from the very nature of the material, substrates with uniform, low birefringence cannot be produced stably; and further it is very difficult to produce, by injection molding, a substrate with low birefringence which has a larger diameter than acoustic compact disks.

To improve the poor dimensional stability of polymers mainly comprising methyl methacrylate, which is the defect of said polymers, copolymers of methyl methacrylate with aromatic vinyl monomers have been proposed, for example, in Japanese Patent Application Kokai (Laid-open) Nos. 38,446/82 and 88,843/83. However, copolymers with vinyl monomers having an aromatic ring are apt to develop birefringence and cannot be used in partice.

Copolymers with cyclohexyl methacrylate have been proposed to decrease hygroscopicity without deteriorating the birefringent property in Japanese Patent Application Kokai (Laid-open) Nos. 5,318/83 and 127,754/83. However, since a large amount of cyclohexyl methacrylate must be copolymerized to decrease hygroscopicity in comparison with aromatic vinyl monomers, there arises the problem of accompanying decrease of thermal resistance and of material strength.

Japanese Patent Application Kokai (Laid-open) Nos. 227,909/84, 13,335/85 and 99,111/85 have proposed to use copolymers of a polymethacrylic ester structure having the tricyclo[$5.2.1.0^{2,6}$]deca-8-yl group in the side chain as the material of various optical elements including optical disk substrates. However, these proposals can be hardly regarded as having given due consideration to the thermal stability in molding the material into an optical disk substrate or to the mechanical strength of the molded substrate.

Further, in optical disk substrates capable not only of reproducing information but also of recording it, a still more excellent birefringent property and dimensional stability are required. However, resin materials which can fully answer such demands have not been found yet.

SUMMARY OF THE INVENTION

In view of the circumstances mentioned above, the object of this invention is to provide an optical disk substrate formed of a methacrylic resin which is excellent in dimensional stability, well balanced between thermal resistance and mechanical strength, and of low birefringence even when formed by such methods as injection molding and compression molding.

This invention provides an optical disk substrate comprising a copolymer produced by polymerizing 50 to 65% by weight of methyl methacrylate (a) units, 20 to 35% by weight of tricyclo[$5.2.1.0^{2,6}$]deca-8-yl methacrylate (b) units, 5 to 25% by weight of cyclohexyl methacrylate (c) units and 1 to 5% by weight of acrylic ester (d) units.

DISCLOSURE OF THE INVENTION

The methacrylic resin of this invention can be obtained by the copolymerization of methacrylic and acrylic ester monomers of respective units of (a), (b), (c) and (d).

The content of the (a) unit is 50 to 65% by weight.

When the content of the (a) unit is less than 50% by weight, the resulting resin has low mechanical strength. When it exceeds 65% by weight, the resulting resin is not sufficiently improved in hygroscopicity.

The content of the (b) unit is 20 to 35% by weight. When the content is less than 20% by weight, the heat distortion temperature and hygroscopicity of the resulting resin are not improved sufficiently. When it exceeds 35% by weight, the resulting resin has a decreased thermal decomposition initiation temperature and is hence apt to develop bubbles and silver streaks in molding, and further gives decreased mechanical strength.

The content of the (c) unit is 5 to 25% by weight. The presence of the (c) unit gives a good birefringent property and additionally improves the water absorption property and is hence favorable for obtaining a copolymer of well balanced properties. However, too high a content lowers the mechanical strength. Accordingly, its content is not higher than 25% by weight.

The content of the (d) unit is 1 to 5% by weight. The presence of this acrylic ester is favorable because it acts to improve the resistance to thermal decomposition of methacrylic resin. However, its content is not higher than 5% by weight because too high a content causes the decrease of heat distortion temperature.

The acrylic ester (d) is an ester of acrylic acid with an aliphatic monohydric alcohols. Specific examples thereof include the acrylic acid ester of methyl, ethyl, propyl, n-butyl, 1-cyclohexylethyl, cyclohexyl, and tricyclo[5.2.1.0$^{2,6}$]deca-8-yl alcohol.

Further, the methacrylic resin of this invention can additionally contain other vinyl monomer units within the range not deleterious to the effect of this invention.

These other monomer units include, for example, aromatic vinyl compounds such as styrene, acrylonitrile, maleic anhydride and acrylic acid. Particularly suitable among these are aromatic vinyl compounds because they render the resin less hygroscopic, but their content should be not more than about 10% by weight from the viewpoint of birefringence.

The methacrylic resin of low hygroscopicity used in this invention may be prepared by any polymerization methods including mass polymerization, solution polymerization, suspension polymerization and emulsion polymerization.

When the resin is to be obtained as a sheet material it is preferably prepared by mass polymerization using the casting method. When a molding material is intended, mass, suspension or emulsion polymerization is preferable from the view point of operation efficiency and productivity.

The polymer should preferably be not contaminated with foreign matters. If necessary, polymerization is preferably carried out after removing dust and other matters beforehand from the monomer by filtration, distillation and like means.

Contamination with foreign matters should preferably be avoided also in the post-treatment conducted after polymerization. In this respect, particularly preferable methods of polymerization are mass polymerization and suspension polymerization.

The method of mass polymerization or suspension polymerization may be conventional ones known to the art.

In these methods, polymerization is carried out in the presence of a radical polymerization initiator and, for the purpose of molecular weight control, a chain transfer agent.

In mass polymerization using the casting method, a partly polymerized compound is first prepared from a monomer mixture compounded in a predetermined proportion, which is then poured into a cell made of glass or stainless steel and polymerized for several hours.

The polymerization temperature may be suitably selected from the range of 50° to 150° C. A temperature of 70° to 120° C. is particularly preferable.

Examples of radical polymerization initiators to be used include azo compounds such as 2,2'-azobis(isobutyronitrile), 1,1'-azobis(cyclohexanecarbonitrile), 2,2'-azobis(2,4-dimethylvaleronitrile) and azobisisobutanol diacetate; and organic peroxides such as lauroyl peroxide, di-tert-butyl peroxide, dicumyl peroxide, methyl ethyl ketone peroxide, di-tert-butyl perphthalate, di-tert-butyl peracetate, and di-tert-amyl peroxide.

When the methacrylic resin of this invention is prepared to be used as a molding material, its molecular weight is preferably controlled so as to give a melt index of 1.0 to 50 g/10 min. at a melting temperature of 230° C. and a load of 3.8 kg.

At a melt index of 1.0 or less the polymer of this invention cannot show a sufficiently low birefringence when molded. A melt index exceeding 50 is also unfavorable because it leads to a decreased mechanical strength.

When the resin of this invention is obtained as a sheet material by means of casting, the melt index needs only to be 50 or less because no molecular orientation occurs in forming and hence apprehension of birefringence is unnecessary.

The control of the molecular weight is performed by adding a chain transfer agent to the polymerization system.

Examples of the chain transfer agent include n-butyl mercaptan, n-octyl mercaptan, and n-dodecyl mercaptan.

The methacrylic resin obtained according to the process of this invention may also be used after compounded with other polymers as occasion demands. Also, it may be used after incorporated with additives such as antioxidants, weather proofing agents, coloring agents and release agents.

For processing the methacrylic resin into optical disk substrates, conventional processing methods used for prior resins mainly comprising methyl methacrylate units, such as injection molding and compression molding, are used.

Particularly preferable is the method of injection molding, which can make the most of the characteristic properties of the methacrylic resin of this invention and makes the mass production of the disk substrates possible.

In injection molding, the molding conditions including molding resin temperature, mold temperature, injection speed and injection pressure as suitably controlled, depending on the size of articles to be formed and other factors, such that the minute pits of the nickel stamper provided on the inner surface of the mold may be accurately transferred and no warp, twist etc. may be developed owing to molding residual strain. Preferably, the resin temperature is 250° to 300° C., mold temperature 60° to 95° C., injection periods 0.2 to 2 seconds, mold holding pressure 100 to 1500 kg/cm$^2$ and mold holding time 0.1 to 3 seconds.

The disk substrate can also be fabricated by cutting out a disk of a predetermined size from a sheet obtained by the cast polymerization method.

In this case, minute information pits can be recorded on the substrate surface by coating a photoresistive resin material on the optical dusk substrate and then setting the resin material.

PREFERRED EMBODIMENTS OF THE INVENTION

This invention is described further in the detail below with reference to Examples, but it is in no way limited thereto.

Among the methods of determination of physical properties used in the Examples, total transmittance and haze value were determined with a 3 mm thick specimen according to ASTM D 1003; flexural strength was determined according to ASTM D 790 and heat distortion temperature according to ASTM D 648.

Water absorption was determined after 24 hours in distilled water at 60° C. according to ASTM D 570.

Melt index was determined at 230° C. and at a load of 3.8 kg according to ASTM D 1238.

Birefringence was determined by measuring retardation at 546 nm by the Sénarmont Compensator method using a polarization microscope.

Thermal decomposition initiation temperature was determined by the thermogravimetric method using a thermobalance.

EXAMPLE 1

In a 100 l reactor equipped with a stirrer was placed 45 kg of demineralized water. Then 30 g of polyvinyl alcohol was added and dissolved thereinto as a suspending agent.

Separately, 75 g of n-dodecyl mercaptan as a chain transfer agent and 90 g of lauroyl peroxide as an initiator were dissolved in a monomer mixture of 17.4 kg of methyl methacrylate and 6 kg of tricyclo[5.2.1.0$^{2,6}$]deca-8-yl methacrylate (hereinafter referred to as TCDMA), and 6 kg of cyclohexyl methacrylate and 0.6 kg of methyl acrylate, and the resulting solution was charged into the reactor.

Polymerization was carried out at 80° C. After about 3 hours, the polymerization mixture was brought to 98° C. and maintained at the temperature for further 3 hours.

The polymer obtained was dehydrated, washed with water, dried and then pelletized at a cylinder temperature of 240° C.

The pellets were used to prepare specimens for determination of physical properties. The results of determination thus obtained are shown in Table 2.

Separately, disk-shaped specimens 120 mm in diameter and 1.2 mm in thickness were prepared by injection-molding the pellets at a cylinder temperature of 265° C. and a mold temperature of 60° C.

The birefringence and the water absorption of the disk-shaped specimen obtained above at the points 30 mm and 50 mm apart from the center of the specimen were determined.

EXAMPLE 2 AND COMPARATIVE EXAMPLES 1 to 5

Copolymers were obtained by carrying out polymerization in the same manner as in Example 1 except that the monomer composition was altered as shown in Table 1.

The properties of the copolymers were determined in the same manner as in Example 1. The results thus obtained are shown in Table 2.

TABLE 1

| | Monomer mixture composition (wt. %) | | | | | | |
|---|---|---|---|---|---|---|---|
| | Example | | Comparative Example | | | | |
| | 1 | 2 | 1 | 2 | 3 | 4 | 5 |
| Methyl methacrylate | 58 | 65 | 89 | 40 | 65 | 60 | 58 |
| TCDMA | 20 | 20 | 10 | 30 | 35 | 20 | 40 |
| Cyclohexyl methacrylate | 20 | 13 | | 30 | | 20 | |
| Methyl acrylate | 2 | 2 | 1 | | | | |
| Ethyl acrylate | | | | 2 | | | 2 |

TABLE 2

| | Example | | Comparative Example | | | | |
|---|---|---|---|---|---|---|---|
| | 1 | 2 | 1 | 2 | 3 | 4 | 5 |
| Total transmittance (%) | 92 | 92 | 92 | 92 | 92 | 92 | 92 |
| Haze value | 0.9 | 0.8 | 0.7 | 0.9 | 0.8 | 0.8 | 0.8 |
| Flexural strength (kg/cm$^2$) | 720 | 780 | 1100 | 390 | 770 | 730 | 700 |
| Heat distortion temp. (after annealing) (°C.) | 112 | 113 | 108 | 117 | 118 | 113 | 120 |
| Melt flow index (g/10 min.) | 4 | 4 | 3 | 3 | 3 | 4 | 3 |
| Water absorption (wt. %) | 0.95 | 1.04 | 1.50 | 0.70 | 1.03 | 0.94 | 0.93 |
| Birefringence (nm) | | | | | | | |
| 3 cm from center | 16 | 15 | 14 | 16 | 18 | 16 | 22 |
| 5 cm from center | 10 | 10 | 12 | 13 | 14 | 11 | 18 |
| Heat decomposition initiation temp. (°C.) | 265 | 266 | 266 | 235 | 243 | 252 | 257 |

EXAMPLE 3 to 5 AND COMPARATIVE EXAMPLES 6 to 9

Copolymers were obtained by carrying out polymerization in the same manner as in Example 1 except that the monomer composition was altered as shown in Table 3.

The properties of the copolymers were determined in the same manner as in Example 1. The results thus obtained ae shown in Table 4.

TABLE 3

| | Monomer mixture composition (wt. %) | | | | | | |
|---|---|---|---|---|---|---|---|
| | Example | | | Comparative Example | | | |
| | 3 | 4 | 5 | 6 | 7 | 8 | 9 |
| Methyl methacrylate | 52 | 52 | 63 | 75 | 40 | 40 | 12 |
| TCDMA | 33 | 21 | 26 | 15 | 40 | 15 | 45 |
| Cyclohexyl methacrylate | 12 | 24 | 8 | 7 | 17 | 42 | 40 |
| Methyl acrylate | 3 | 3 | | 3 | | 3 | |
| Ethyl acrylate | | | 3 | | 3 | | 3 |

TABLE 4

| | Example | | | Comparative Example | | | |
|---|---|---|---|---|---|---|---|
| | 3 | 4 | 5 | 6 | 7 | 8 | 9 |
| Total transmittance | 92 | 92 | 92 | 92 | 92 | 92 | 92 |

TABLE 4-continued

| | Example | | | Comparative Example | | | |
|---|---|---|---|---|---|---|---|
| | 3 | 4 | 5 | 6 | 7 | 8 | 9 |
| (%) | | | | | | | |
| Haze value | 0.8 | 0.8 | 0.8 | 0.7 | 0.8 | 0.8 | 0.9 |
| Flexural strength (kg/cm$^2$) | 690 | 680 | 760 | 920 | 410 | 390 | 120 |
| Heat distortion temp. (after annealing) (°C.) | 123 | 119 | 116 | 110 | 125 | 117 | 128 |
| Melt flow index (g/10 min.) | 3 | 3 | 3 | 4 | 3 | 3 | 3 |
| Water absorption (wt. %) | 0.88 | 0.92 | 0.98 | 1.38 | 0.70 | 0.76 | 0.62 |
| Birefringence (nm) | | | | | | | |
| 3 cm from center | 17 | 18 | 16 | 15 | 16 | 16 | 19 |
| 5 cm from center | 13 | 14 | 12 | 11 | 12 | 13 | 14 |
| Heat decomposition initiation temp. (°C.) | 265 | 265 | 266 | 266 | 264 | 265 | 263 |

The optical disk substrate of this invention has a low hygroscopicity, good dimensional stability, good balance between thermal stability and mechanical strength, and additionally a low birefringence.

We claim:

1. An optical disk substrate comprising a copolymer produced by polymerizing 50 to 65% by weight of methyl methacrylate (a) units, 20 to 35% by weight of tricyclo[5.2.1.0$^{2,6}$]deca-8-yl methacrylate (c) units, 5 to 25% by weight of cyclohexyl methacrylate (c) units and 1 to 5% by weight of acrylic ester (d) units.

2. An optical disk substrate according to claim 1 wherein the melt index of said copolymer is 1.0 to 50 g/10 min.

* * * * *